United States Patent [19]
Ogiyama

[11] Patent Number: 6,020,981
[45] Date of Patent: *Feb. 1, 2000

[54] FACSIMILE APPARATUS WHICH IS CAPABLE OF STORING IMAGE INFORMATION IN A STORAGE UNIT

[75] Inventor: Tetsuya Ogiyama, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/580,287

[22] Filed: Dec. 28, 1995

[30] Foreign Application Priority Data

Dec. 28, 1994 [JP] Japan ..................................... 6-327711

[51] Int. Cl.⁷ ................................................... H04N 1/00
[52] U.S. Cl. ........................... 358/434; 358/404; 358/438
[58] Field of Search ..................................... 358/434, 435, 358/436, 437, 438, 439, 442, 444, 400, 402, 403, 404, 1.9, 1.6, 1.15; 379/100.01, 100.06, 102.01, 106.01

[56] References Cited

U.S. PATENT DOCUMENTS

| | | | |
|---|---|---|---|
| 4,727,589 | 2/1988 | Hirose et al. | 382/56 |
| 4,907,094 | 3/1990 | Mishima et al. | 358/437 |
| 5,077,742 | 12/1991 | Tsumura | 371/32 |
| 5,113,502 | 5/1992 | Merrill et al. | 709/102 |
| 5,145,488 | 9/1992 | Okada et al. | 379/88 |
| 5,220,438 | 6/1993 | Yamamoto | 358/444 |
| 5,477,339 | 12/1995 | Sugawara et al. | 358/406 |
| 5,579,126 | 11/1996 | Otsuka | 358/403 |

FOREIGN PATENT DOCUMENTS

| | | |
|---|---|---|
| 2155369 | 6/1990 | Japan . |
| 3208463 | 9/1991 | Japan . |
| 3-235552 | 10/1991 | Japan . |
| 04253465 | 9/1992 | Japan . |
| 5-227201 | 9/1993 | Japan . |
| 6698061 | 4/1994 | Japan . |

Primary Examiner—Madeleine Nguyen
Attorney, Agent, or Firm—Foley & Lardner

[57] ABSTRACT

A facsimile apparatus system in which a facsimile transmitter transmits a document and a corresponding facsimile receiver receives the document. Before the received document is put in such a state that an operator of the facsimile receiver cannot confirm the contents of the received document, an operator at the side of the facsimile transmitter can retrieve or delete the corresponding document as necessary. The facsimile receiver includes a storage unit for storing therein an image. The facsimile transmitter can inform the facsimile receiver of its own ID and a document management number of the document being stored in the storage unit of the facsimile receiver but not put in a state readable by the facsimile receiver operator to request the retrieval or deletion of the document. At this time, a communication capability discriminating unit judges whether or not the receiver side has a document deleting capability, and a document control/processing unit controls a document management unit to carry out the retrieval or deletion of the corresponding document stored in the storage unit.

7 Claims, 8 Drawing Sheets

FACSIMILE APPARATUS WHICH IS CAPABLE OF STORING IMAGE INFORMATION IN A STORAGE UNIT

BACKGROUND OF THE INVENTION

1. Field of the Invention

The present invention relates to a facsimile apparatus and more particularly, to a storage type facsimile transmitter or receiver which is capable of storing an image information to a storage unit.

2. Description of the Related Art

The convential storage type facsimile apparatus has not only functions of transmitting an image information of an original document, and for receiving and printing on the received image on a recording paper, but also has confidential transmission or memory reception functions. The memory reception function enables the received image to be once stored in a storage unit such as a hard disk drive or a semiconductor memory. The confidential transmission function activates to transmit a confidential document (image information) with an addressee designated in such a manner that only a person authorized as the addressee at the receiver side can extract the document (image information) from the storage unit and can conform it on a display screen or print out the information on recording paper.

When the facsimile apparatus can be connected to an information processor such as a computer or an electronic device, the facsimile apparatus may have its own facsimile mail box of each individual for the received image to be stored therein. In the case of such a facsimile apparatus, the due receiver of the received image can confirm or print out the contents of his or her facsimile mail box by directly manipulating the information processor having the facsimile reception function.

However, during facsimile transmission operation, there may sometimes occur such a situation that a wrong image is transmitted due to operator's mistake. Further, after a document has been transmitted carelessly in haste, there may sometimes occur a situation where the sender notices a wrong addressee name or a wrong unit in the product quotation or estimate price by confirming the original document already transmitted. In such a case, the sender may phone the receiver as the party designation to cancel the received contents, but in the absence of the party, it becomes impossible. Further, it may sometimes be practically impossible to involve such party's troublesome labor. Such a situation may also be considered that it is practically impossible to ask the receiver not to read the contents of the received information and the information contents may lead to a problem.

On the other hand, in an integrated office computer system made up of workstations or office processors, electronic mail can be transmitted between these workstations or office processors. For example, the integrated office computer system as disclosed in Japanese Patent Laid-Open Publication No. 3-235552 is designed so that even after a send mail is already transmitted to a receiver side, the send mail can be canceled so long as the transmitted mail is not read out yet by an operator of the receiver side. A similar technique in the electronic mail field is also disclosed in Japanese Patent Laid-Open Publication No. 5-227201.

In the facsimile communication field, however, since the printing of an image or document is usually carried out concurrently with the reception of a document, it has been impossible to cancel the such transmitted contents. In the facsimile communication field, further, since communication is carried out based on a predetermined facsimile communication protocol, it has been impossible to cancel the transmitted contents for this reason, unlike the electronic mail case.

Furthermore, in the prior art facsimile apparatus, when confidential transmission in particular is carried out, there may occur such a situation that the received image information remains in its storage unit for a long time without being extracted by the due addressee. For this reason, it has been necessary for the sender to telephone the due addressee each time to confirm the fact that the addressee has printed out and checked the document. Accordingly, the due addressee, whenever asked to confirm it by telephone, he or she has had to troublesomely respond to it in an on-target manner.

SUMMARY OF THE INVENTION

It is therefore an object of the present invention to provide a facsimile apparatus which, when document image information received by a party side stays in its unconfirmable state, can delete the contents from a sender side as necessary.

Another object of the present invention is to provide a facsimile apparatus in which, when a sender side transmits the wrong document to the receiver side carelessly, can delete the contents from the sender side as necessary.

Further object of the present invention is to provide a facsimile apparatus in which a sender side can check whether or not a transmitted document or image was put in a state confirmable by an addressee of a receiver side without involving the addressee in cumbersome responses.

In accordance with an aspect of the present invention, there is provided facsimile apparatus which comprises, (a) a receiving circuit for receiving document information transmitted from a facsimile transmitter corresponding to a facsimile communication protocol, (b) a received-document storage circuit for storing the document information, (c) an output circuit for outputting contents of the document information, (d) a receiving circuit for receiving a demand signal transmitted from the facsimile transmitter demanding the deletion of the document information; and (e) a deleting circuit, responsive to the demand signal, for deleting the document information in the received-document storage circuit.

The facsimile apparatus may further comprises a circuit for transmitting a signal representing a completion of a deletion by the deleting circuit to the facsimile transmitter.

Another facsimile apparatus of the present invention comprises (a) a receiving circuit for receiving document information transmitted from a facsimile transmitter corresponding to a facsimile communication protocol, (b) a received-document storage circuit for storing the document information and document management information for specifying the document information, (c) an output circuit for outputting contents of the document information, (d) a demand signal receiver for receiving a demand signal containing the document management information for demanding the deletion of the document information of the document management information, the demand signal being transmitted from the facsimile transmitter, (e) a searching circuit, responsive to the demand signal, for searching the document information from the received-document storage circuit corresponding to the document management information in the demand signal, and (f) a deleting circuit for deleting the document information which is searched by the searching circuit.

Still another facsimile apparatus of the present invention comprises (a) a receiving circuit for receiving document information transmitted from a facsimile transmitter corresponding to a facsimile communication protocol, (b) a received-document storage circuit for storing the document information and document management information for specifying the document information, (c) an output circuit for outputting contents of the document information, (d) a demand signal receiving circuit for receiving a first demand signal and a second demand signal which contains the document management information for demanding the deletion of the document information of the document management information, the first and second demand signals being transmitted from the facsimile transmitter, (e) a determining circuit, responsive to the first demand signal, for determining whether or not the document information remains in the received-document storage circuit without being output by the output circuit, (f) a circuit for transmitting a result of a determination of the determining circuit to the facsimile transmitter, (g) a searching circuit, responsive to the second demand signal, for searching the document information from the received-document storage circuit corresponding to the document management information in the second demand signal; and (h) a deleting circuit for deleting the document information which is searched by the searching circuit.

The facsimile transmitter of the present invention comprises a transmission circuit for transmitting the document information and the document management information, a circuit for generating and transmitting the first demand signal, a receiving circuit for receiving the result of the determination of the determining circuit of the facsimile receiver, and a display for displaying the result.

DETAILED DESCRIPTION OF THE PREFERRED EMBODIMENTS

Figure 1:
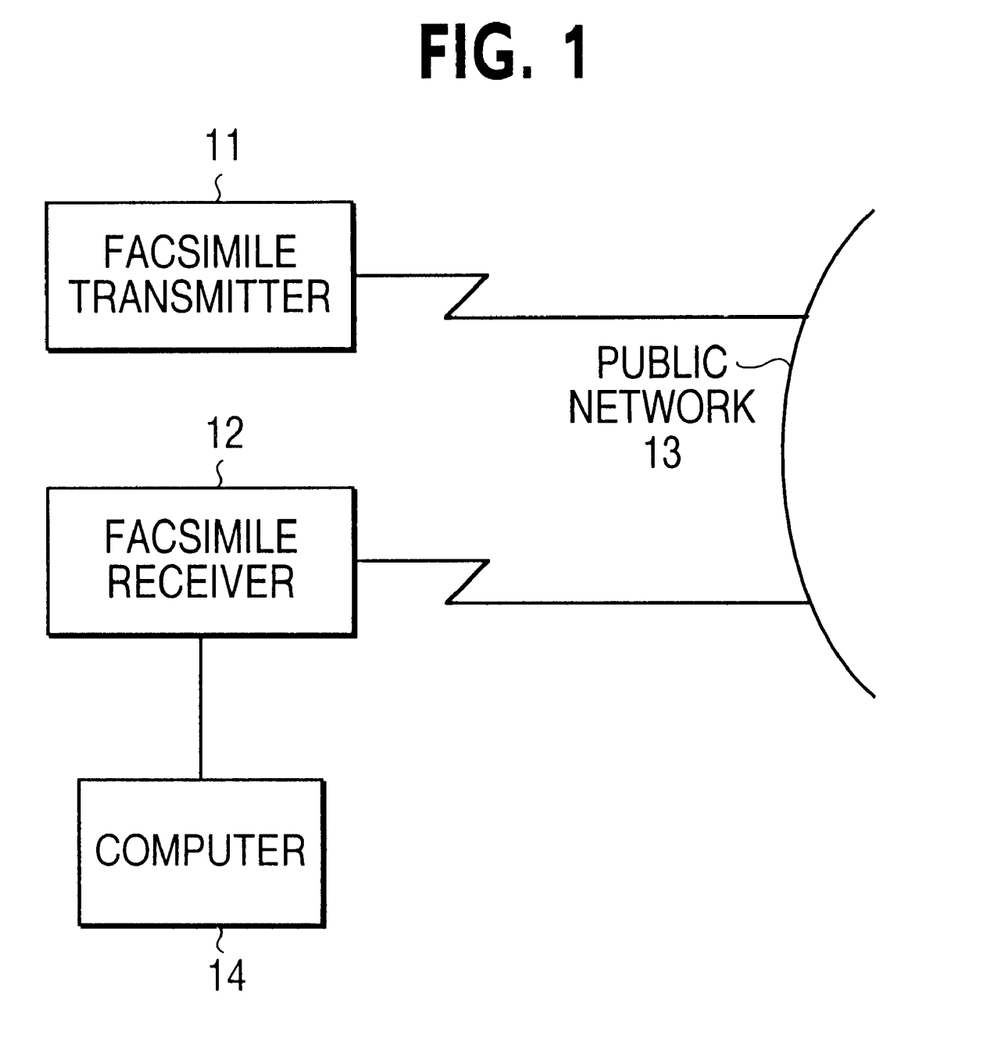
FIG. 1 is a block diagram of an arrangement of a facsimile communication system employing a facsimile apparatus in accordance with an embodiment of the present invention.

Referring first to FIG. 1, there is shown a communication system in which a facsimile apparatus in accordance with an embodiment of the present invention is employed. In the communication system, a facsimile transmitter 11 and a facsimile receiver 12 are connected to a public network 13. Although a usual facsimile apparatus has transmitting and receiving functions, explanation will be made herein in conjunction with a case where the facsimile transmitter 11 has only the transmitting function while the facsimile receiver 12 has only the receiving function for convenience of explanation. Connected to the facsimile receiver 12 is a computer 14.

Figure 2:
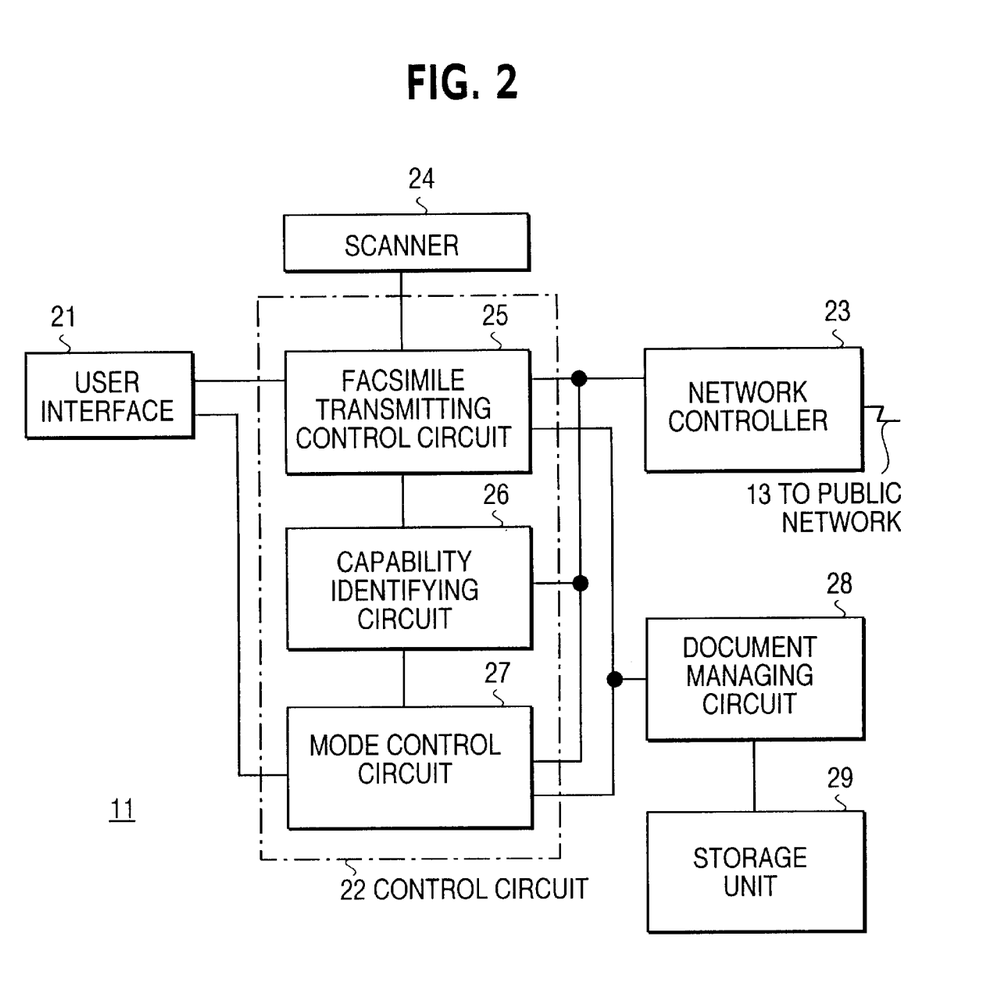
FIG. 2 is a block diagram of the facsimile transmitter of the embodiment according to the present invention.

In FIG. 2, the facsimile transmitter 11 includes a user interface 21, a typical example of which is an operating or control panel including a display. Also included in the facsimile transmitter 11 is a control circuit 22 which controls the facsimile communication, a network controller 23, a scanner 22 for scanning a document to generate an image data, a document managing circuit 28 and a storage unit 29.

The control circuit 22 has a facsimile transmitting control circuit 25 for controlling the transmission of image information, a capability identifying circuit 26 for identifying a communication capability of a receiver side, and a mode control circuit 27 for controlling a deletion request of document deletion at the receiver side and controlling a document management of the document managing circuit 28.

The facsimile transmitting control circuit 25 controls the user interface 21, network controller 23, scanner 24 and document managing circuit 28 in response to information from the user interface 21 and the capability identifying circuit 26. Under the control of the facsimile transmitting circuit 25, the scanner 24 outputs the image data by scanning the document, and the image data are coded to an image information by the facsimile transmitting control circuit 25, and then the image information is transmitted to public network 13 via the network controller 23. The document managing circuit 28 controls a storage unit 29, such as a hard disk drive, for storing therein a transmission result generated by the facsimile transmitting control circuit 25. The transmission result is stored every time the facsimile transmission ends.

Figure 3:
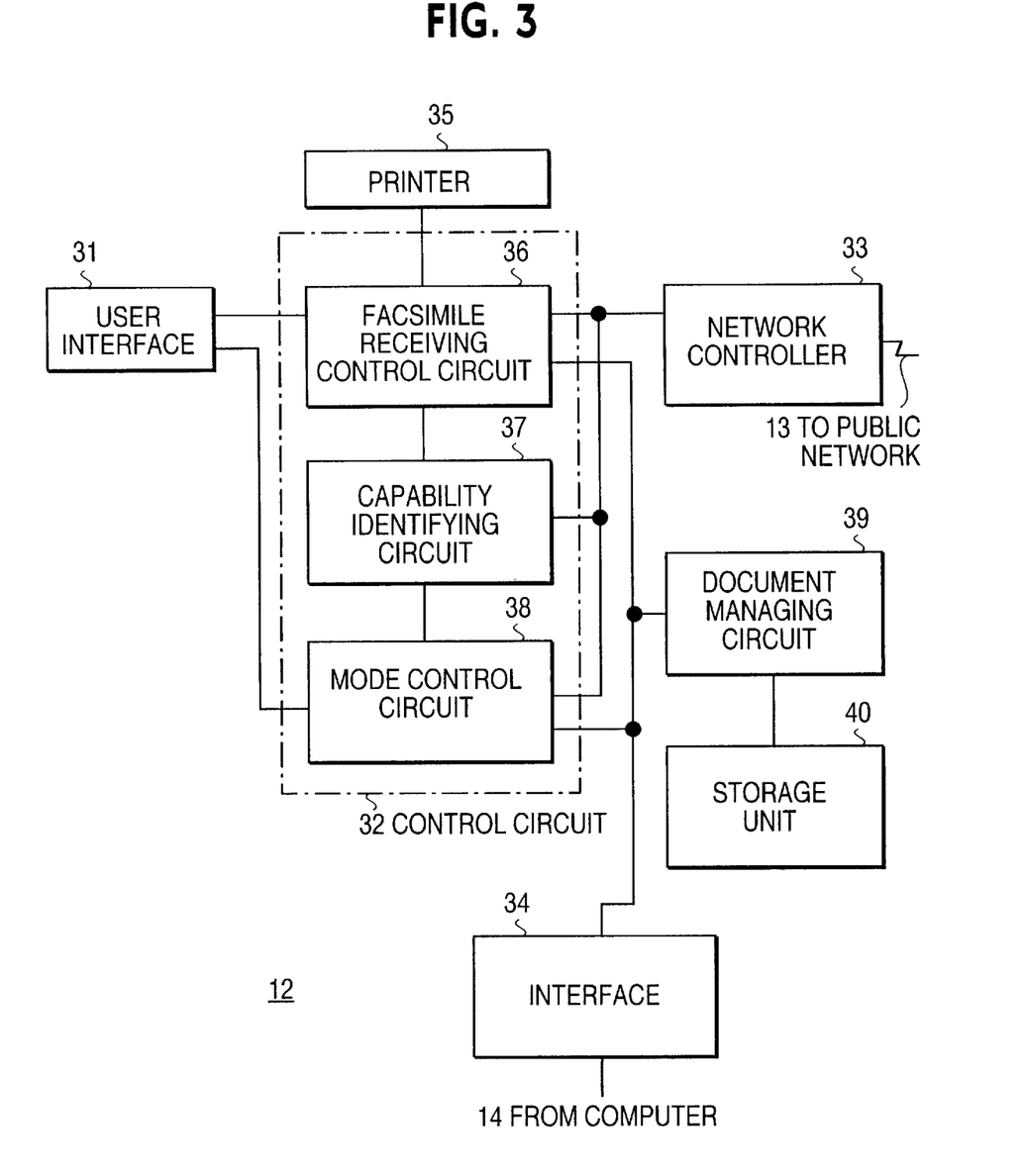
FIG. 3 is a block diagram of the facsimile receiver of the embodiment according to the present invention.

In FIG. 3, the facsimile receiver 12 includes a user interface 31 a typical example of which is a control panel. Also included in the facsimile receiver 12 is a control circuit 32 which controls the facsimile communication, a network controller 33, an interface 34 which is connected to the computer 34, a printer 35 for printing a received image information transmitted from a transmitter side, a document managing circuit 39 and a storage unit 40.

The control circuit 32 has a facsimile receiving control circuit 36 for controlling the reception of the image information, a capability identifying circuit 37 for identifying a communication capability of the transmitter side, and a mode control circuit 38 for controlling the document managing circuit 39 for performing deletion of the received image information in the storage unit 40 corresponding to the deletion request from the transmitter side. The storage unit 40 is a hard disk for storing therein the document image information sent from the transmitter side.

The facsimile receiving control circuit 36 controls the user interface 31, network controller 33, printer 35 and document managing circuit 39 in response to information from the user interface 21 and the capability identifying circuit 26. Under the control of the facsimile receiving circuit 36, the image information received from the network controller 33 are decoded to image data in the facsimile receiving control circuit 36, and then the image data are transmitted to the printer 35 for printing. After the printing, the facsimile receiving control circuit 36 generates a clear signal to the document managing circuit 39 to clear the document information printed by the printer 35.

Each of the facsimile transmitter 11 and receiver 12 has a central processing unit (CPU) (not shown). The CPU carries out various types of controls in accordance with a program.

Figure 4:
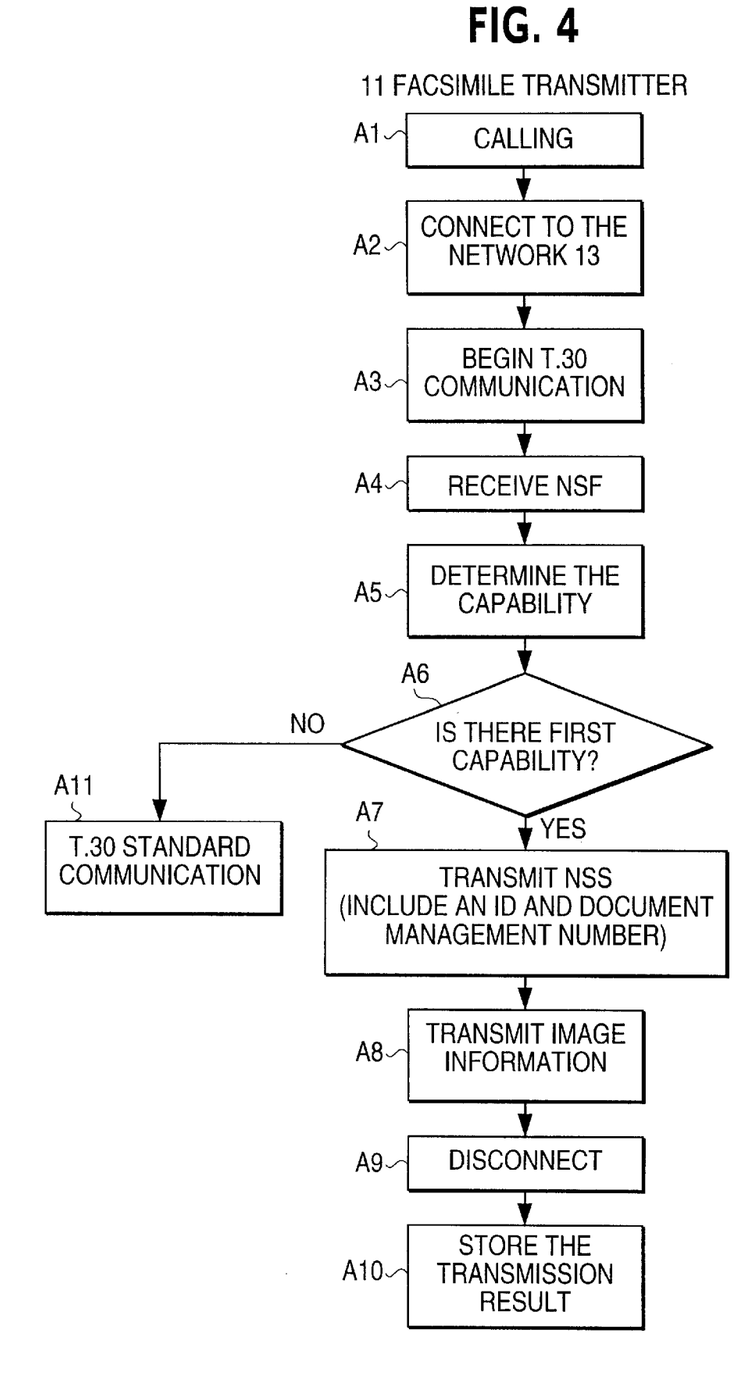
FIG. 4 is a flow chart showing an operation of the facsimile transmitter of FIG. 2.
Figure 5:
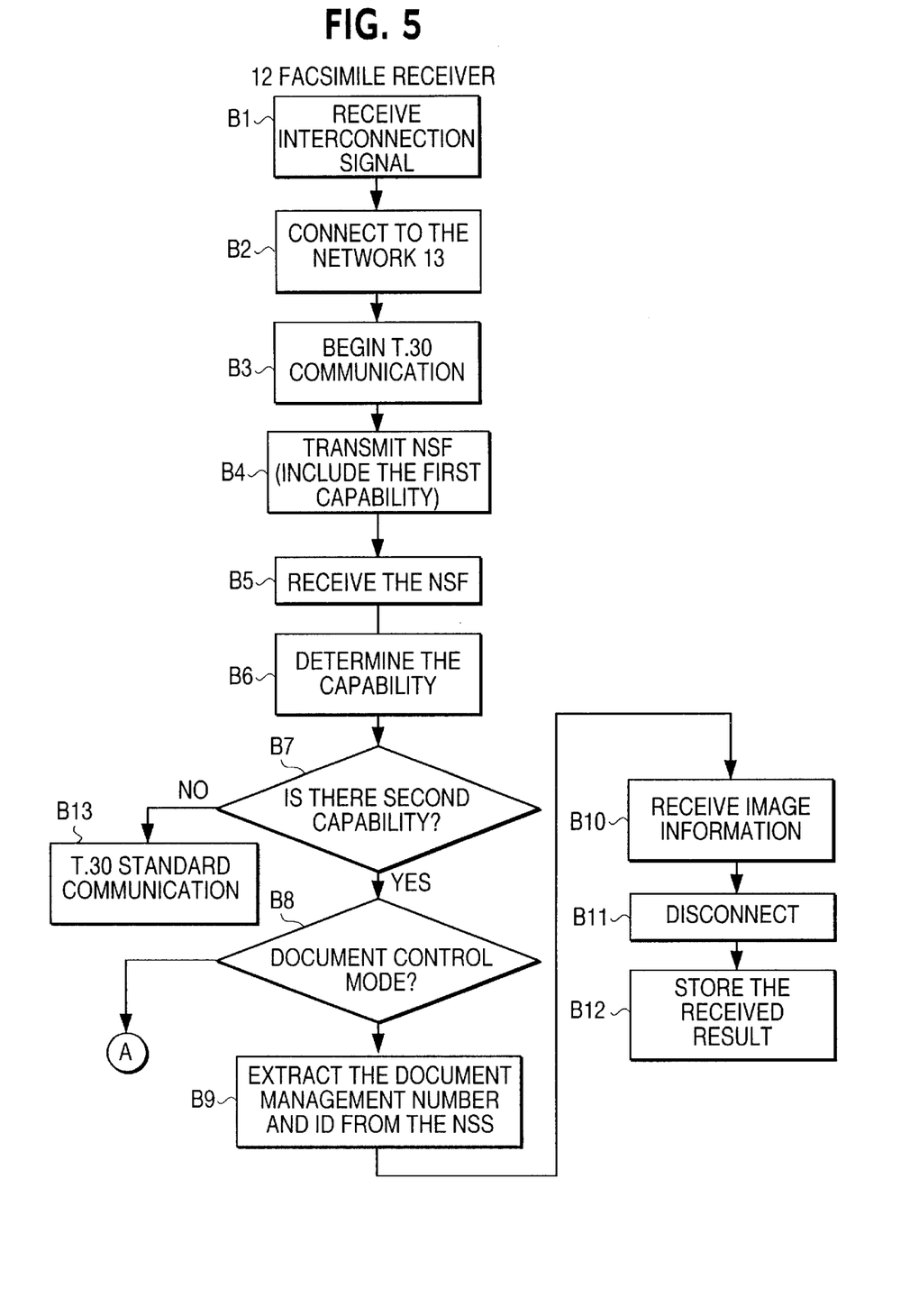
FIG. 5 and FIG. 6 are flow charts showing an operation of the facsimile receiver of FIG. 3.
Figure 6:
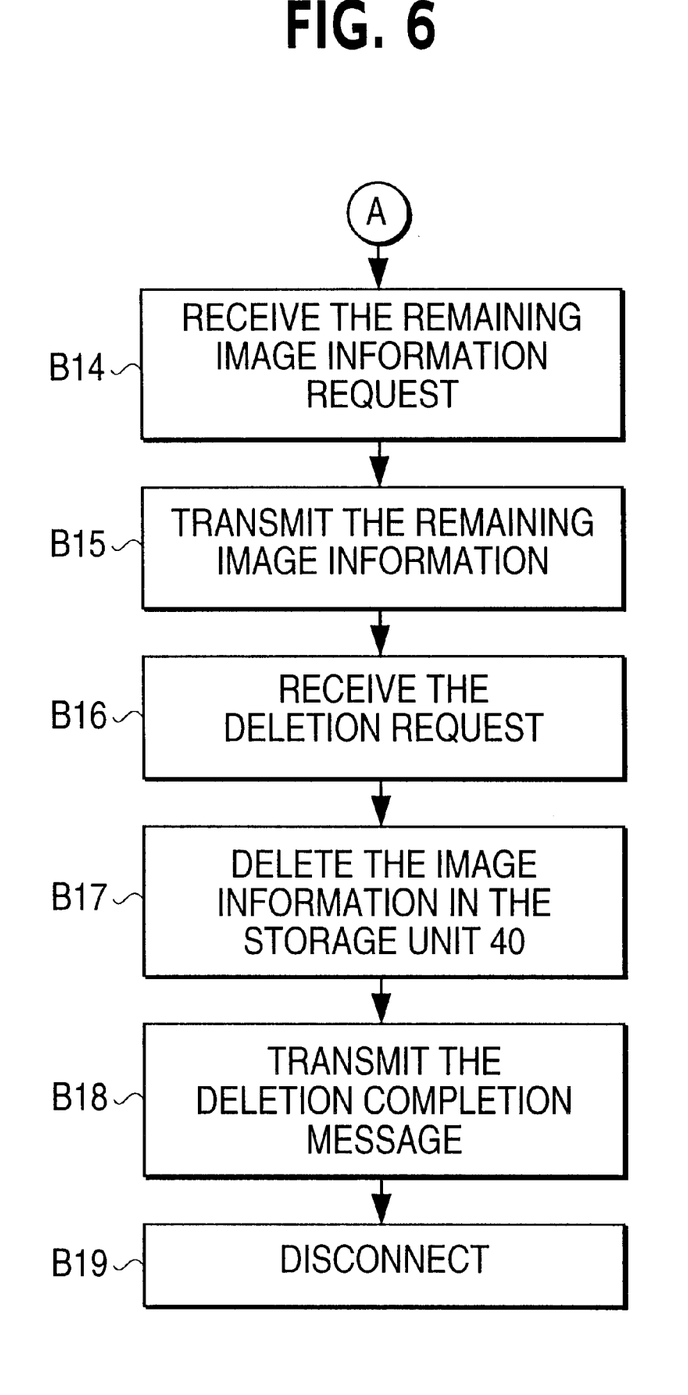

FIG. 4 is a flow chart showing a transmitting operation of the facsimile transmitter 11, and FIG. 5 and FIG. 6 are flow charts showing an operation of the facsimile receiver 12.

In FIG. 2 and FIG. 4, the user interface 21 of the facsimile transmitter 11 waits for operator's instruction. Once the operator gives an image transmission instruction to the user interface 21, the user interface 21 issues an image transmission command to the facsimile transmitting control circuit 25 (step A1 as shown in FIG. 4). Then the facsimile transmitting control circuit 25 controls the network controller 23 to connect the network controller 23 to the facsimile receiver 12 as the party side via the public network 13 (step A2).

Thereafter, the facsimile transmitter 11 and facsimile receiver 12 are interconnected through a known interconnecting procedure. After the interconnection, facsimile protocol based on the ITU-T, T. 30 recommendation begins under the control of the facsimile transmitting control circuit 25 (step A3). The facsimile transmitting control circuit 25 receives a non-standard facilities (NSF) message from the facsimile receiver 12 when the facsimile receiver 12 has a function of performing a non-standard communication (step A4), and then the NSF is transmitted to the capability identifying circuit 26. In this case, the capability identifying circuit 26 analyzes the NSF (step A5). The capability identifying circuit 26 determines whether or not the facsimile receiver 12 has a function (which will be referred to as the first capability, hereinafter) of deleting the received and stored image information corresponding to a deletion request from the facsimile transmitter 11. The capability determining result is sent from the capability identifying circuit 26 to the facsimile transmitting control circuit 25.

Responsive to the capability determining result, the image information transmitting unit 25 judges whether or not the facsimile receiver 12 has the first capability (step A6). When the facsimile receiver 12 has such-a capability, the facsimile transmitting control circuit 25 carries, on a non-standard set-up (NSS) message, an identification (ID) number uniquely given to the facsimile transmitter 11 and a document management number uniquely allocated to each facsimile transmission to inform the facsimile receiver 12 of the effect (step A7). In this connection, it is considered that the telephone number of its own station is used as the ID number as an example. In this case, the transmitting operation of the image information by the facsimile transmitting control circuit 25 is effected based on, e.g., the T. 30 recommendation (step A8), in the similar way to a known, usual facsimile apparatus.

After completing the transmission of the transmission image, the network controller 23 disconnects to the public network 13 (step A9) and the facsimile transmitting control circuit 25 generates a transmission result including its transmission result and time, the document management number generated at the step A7, and the capability determining result generated at the step A5. Then the mode control circuit 27 instructs the document managing circuit 28 to store the transmission result generated in the facsimile transmitting control circuit 25 to the storage unit 29 (step A10).

Meanwhile, as shown in FIG. 3 and FIG. 5, when the facsimile receiver 12 accepts at the network controller 33 an interconnection signal (step B1) from the public network (generated at the step A1 of FIG. 4 by the facsimile transmitter 11), the network controller 33 connects to the network 13 (step B2) and notifies the facsimile receiving control circuit 36. In response to the notification, the facsimile receiving control circuit 36 begins the communication based on the aforementioned T. 30 recommendation (step B3). If the facsimile receiver 12 has the first capability of deleting the predetermined image information as mentioned above, then the facsimile receiving control circuit 36 informs the facsimile transmitter 11 of the fact by sending the NSF message to the public network 13 (step B4). The NSF is received and analyzed by the facsimile transmitter 11 at the steps A4 and A5 of FIG. 4.

After the step B4, the facsimile receiver 12 receives the NSS signal (step B5) transmitted from the facsimile transmitter 11, and the capability identifying circuit 37 analyzes the NSS message to determine whether or not the facsimile transmitter 11 has a second capability (steps B6 and B7). The second capability represents a transmitter capability of whether the facsimile transmitter 11 can transmit a remained image confirmation request and a deletion request for proposing to the facsimile receiver 12. The remained image confirmation request and deletion request are transmitted at the steps C8 and C12 of FIG. 7. If the capability identifying circuit 37 detects that the facsimile transmitter 11 does not have the second capability, standard communication of T. 30 is performed (step B13). When the capability identifying circuit 37 detects the second capability, the capability identifying circuit 37 detects from the NSS a document control mode message (step B8). The document control mode message is set by the facsimile transmitter 11 only when the facsimile transmitter 11 requests the notice of the remaining image information in the storage unit 40 of FIG. 3 and requests the deletion of the image information in the storage unit 40. If the document control mode message is not detected at the step B8, step B9 is performed. However, if the document control mode message is detected, step B14 of FIG. 6 is performed.

In the step B9, the capability identifying circuit 37 extracts from the NSS message, the document management number and the ID number uniquely given to the facsimile transmitter 11 and then stored in the image facsimile receiving control circuit 36. Then, the image facsimile receiving control circuit 36 carries out the receiving operation of the image information based on the aforementioned T.30 recommendation (step B10), similarly to the conventional facsimile apparatus, and the document image information sent from the facsimile transmitter 11 is received and stored in the facsimile receiving control circuit 36.

After completing the receiving operation, the network controller 33 disconnects from the public network 13 (step B11), and the facsimile receiving control circuit 36 sends to the document managing circuit 39 the received result containing a complete time of the reception, document management number extracted at the step B9, the capability judgement result and the received document image information, then the storage unit 40 stores the received result under the control of the document managing circuit 39 (step B12).

The above transmitting and receiving procedure of the facsimile image is performed by utilizing the non-standard protocol of the prior art facsimile apparatus.

After the facsimile transmission and reception are completed, the operator in the transmitter side can request the message of whether the transmitted document image information has been confirmed by the receiver or not, and can request the deletion of the document image information stored in the storage unit 40 of the facsimile receiver 12. In this case, the facsimile transmitter 11 performs the operation as shown in FIG. 7, and the facsimile receiver 12 performs the operation of steps B1 to B8 as show in FIG. 5 and then steps B14 to B19 as shown in FIG. 6.

Figure 7:
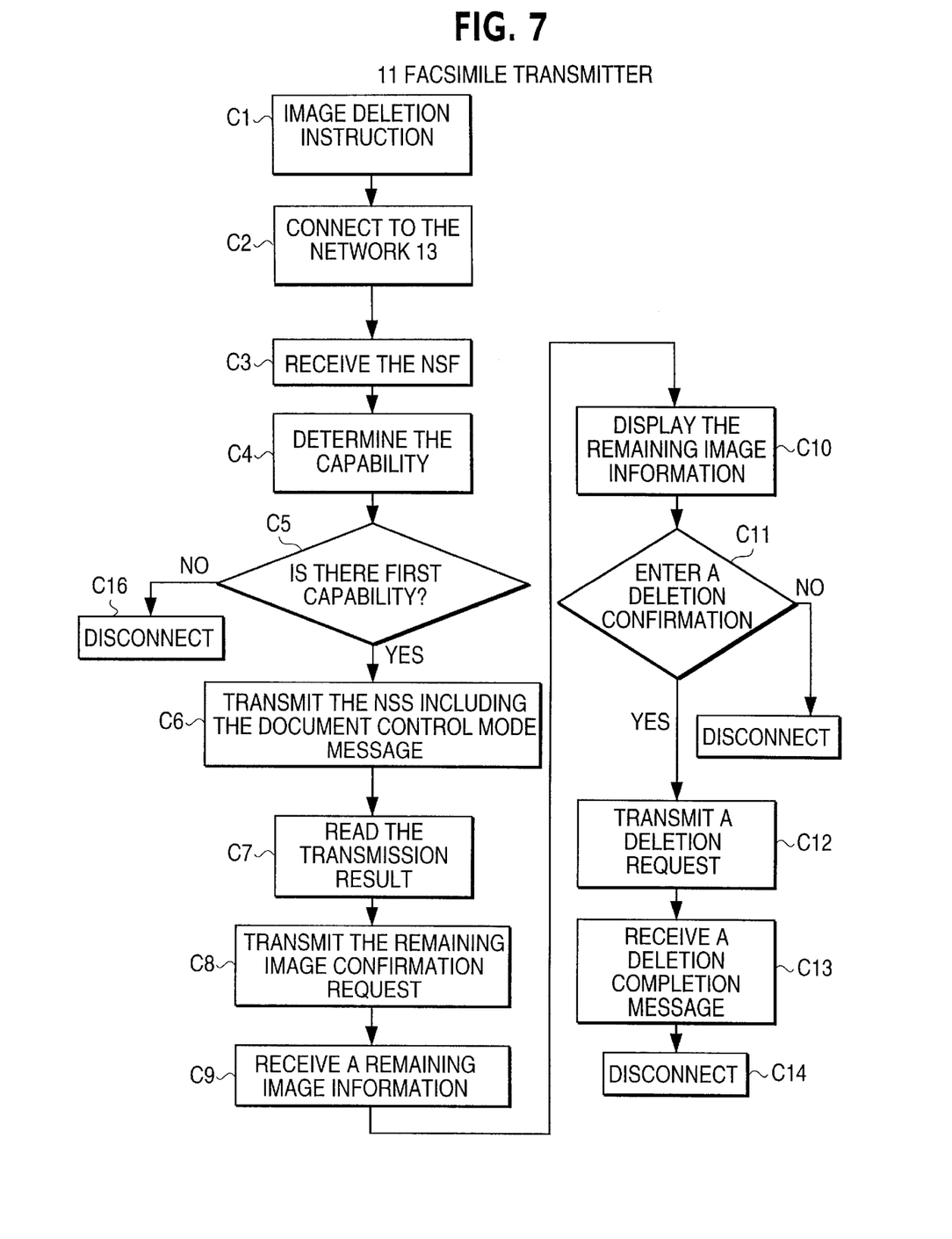
FIG. 7 is a flow chart showing an operation of the facsimile transmitter of FIG. 2 in case the facsimile transmitter requires a deletion of an image information.

In FIG. 7 and FIG. 2, first, a image deletion instruction is sent to the facsimile transmitting control circuit 25 from the user interface 21 (step C1). The facsimile transmitting control circuit 25, when receiving the image deletion instruction, controls the network controller 23 to perform the interconnecting operation with the facsimile receiver 12 to be subjected to the document deletion in accordance with the aforementioned T. 30 recommendation as in the image transmission mode (step C2).

After the connection, the NSF signal is transmitted from the facsimile receiver 12 and then received (step C3). The capability identifying circuit 26 determines whether or not the target facsimile receiver 12 has the earlier-mentioned first capability, and sends its judgement result to the facsimile transmitting control circuit 25 and the mode control circuit 27 as a capability judgement result (steps C4 and C5).

When determining on the basis of the capability judgement result which represents that the facsimile receiver 12 has the first capability, the mode control circuit 27 generates the document control mode message for shifting the control at the facsimile receiver 12 to the document control mode, and then the document control mode message is transmitted to the facsimile transmitting control circuit 25 to set the message in the NSS message. Then the NSS including the document control mode message is transmitted to the facsimile receiver 12 (step C6). Otherwise, that is, when the facsimile receiver 12 does not have the first capability, the facsimile transmitting control circuit 25 controls the network controller 23 to disconnect the public network 13 (step B16) because of impossibility of performing the document deletion.

After transmitting the NSS message, control is shifted to the mode control circuit 27 from the facsimile transmitting control circuit 25. Then, the mode control circuit 27 controls the document managing circuit 28 to read the transmission result from the storage unit 29 (step C7). The transmission result is the data which was stored in the step A10 of FIG. 4. In order to examine whether or not the transmission image of the document management number in the transmission result remains in the corresponding facsimile receiver 12 without being confirmed by the addressee or receiver-side operator, the mode control circuit 27 transmits the remaining image confirmation request to the facsimile receiver 12 through the network controller 23 (step C8).

The mode control circuit 27, when receiving a remaining image information from the facsimile receiver 12 in response to the remained image confirmation request (step C9), informs the user interface 21 of the result. The remaining image information is displayed in the user interface 21 (step C10). Therefore, the transmitter side can confirm the result of whether or not the receiver side has printed out or output the document image information which was transmitted from the transmitter side.

Assume now that the wrong image information remains in the facsimile receiver 12 without being output by the receiver, and the operator wishes to delete the wrong image information. The mode control circuit 27 determines whether or not the operator enters a deletion instruction of the deletion confirmation from the user interface 21 (step C11). Responsive to the deletion instruction, the mode control circuit 27 generates a deletion request including the document management number to be deleted at the facsimile receiver side, and transmits the deletion request to the facsimile receiver 12 (step C12). The facsimile receiver 12 deletes the document image information of the document management number included in the deletion request as described hereinafter, and generates and transmits a deletion completion message representing the deletion completed. When the facsimile transmitter 11 receives the deletion completion message from the facsimile receiver 12 (step C13), the mode control circuit 27 shifts the control to the facsimile transmitting control circuit 25 to begin a phase E based on the aforementioned T. 30 recommendation and issues a disconnect command DCN to disconnect the public network (step C14).

During the above operation, on the side of the facsimile receiver 12, step B1 to step B7 of FIG. 5 are performed corresponding to the operation of the step C1 to C6 of FIG. 7. The capability identifying circuit 37 analyzes the NSS message in the step B6 of FIG. 5 obtained from the facsimile transmitter 11 and then when the circuit 37 detects the fact that the facsimile transmitter 11 has the second capability and the NSS message has the document control mode message, then control shifts to the mode control circuit 38 to begin the flow chart of FIG. 6.

In FIG. 3 and FIG. 6, the mode control circuit 38 receives the remaining image confirmation request from the transmitter 11 (step B14) which was transmitted in the step C8 of FIG. 7. Then the mode control circuit 38 controls the document managing circuit 39 to read the document management number of the document image information which is not outputted and still remains in the storage unit 40. The document management number is then transmitted to the facsimile transmitter 11 as the remaining image information (step B15). When the operator at the transmitter side instructs, in the step C11 of FIG. 7, the document management number to be deleted, the deletion request including the document management number is transmitted to the facsimile receiver 12. When the facsimile receiver 12 receives the deletion request (step B16), the mode control circuit 38 controls the deletion of the received image information of the document management number. Therefore, the document managing circuit 39 carries out the deletion (memory clear) of the received image information of the document management number being stored in the storage unit 40 (step B17). When the deletion completes, the mode control circuit 38 generates the deletion completion message and transmits the message to the facsimile transmitter 11 (step B18). Then the facsimile receiving control circuit 36 receives the DCN to disconnect with the network 13 (step B19).

As described above, after the facsimile transmission of the facsimile transmitter 11 is finished through a series of the above operations, if the sender operator found an additional error in the original document or an operational error, the operator can delete the corresponding transmitted image information stored in the receiver side while the receiver operator does not recognize it, so long as the timing of the deletion request is before the received image is checked or output by the receiver operator.

Figure 8:
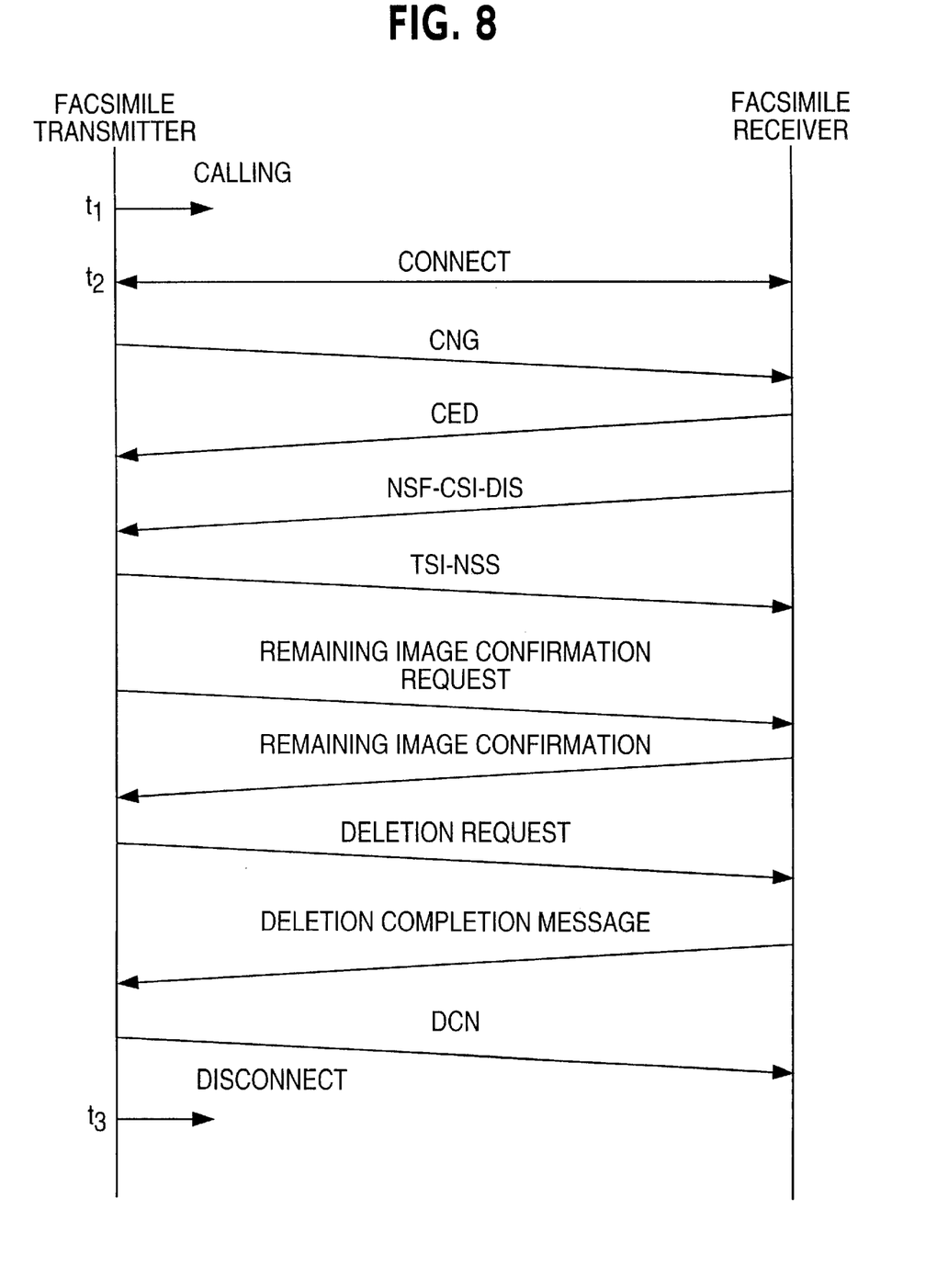
FIG. 8 is a timing chart for explaining how control is carried out between the facsimile transmitter and facsimile receiver when it is required to delete the image information.

FIG. 8 shows the protocol between the facsimile transmitter 11 and receiver 12 when the image deletion is performed as described above. When the facsimile transmitter 11 issues a line interconnection request at a time $t_1$ and is connected to the party facsimile receiver 12 at a time $t_2$, the facsimile transmitter 11 first sends a signal CNG (ringing tone), whereas the facsimile receiver 12 in response to the signal CNG sends signals CED (for discrimination of the called station), NSF, CSI (for identification of the called terminal) and DIS (digital identification signal) back to the facsimile transmitter 11.

The facsimile transmitter 11, on the other hand, transmits signals TSI and NSS, and then issues the remained image confirmation request and the deletion request. In response to these requests, the facsimile transmitter 11 receives the remaining image information and the deletion completion message from the facsimile receiver 12. The deletion request and the remained image confirmation request from the facsimile transmitter 11 and the remaining image information and the deletion completion message from the facsimile receiver 12 are repeated by a necessary number of times. Thereafter, the facsimile transmitter 11 sends the DCN to the facsimile receiver 12 and the line is soon disconnected at a time $t_3$.

In the present embodiment, in this way, there can be deleted that part of the document already transmitted to the facsimile receiver 12 side from the facsimile transmitter 11 which still remains in the storage unit 40 of the facsimile receiver 12 and is not read by the receiver-side operator.

In the foregoing embodiment, the above explanation has been made in connection with the case where the sender operator conducts the retrieving or deleting operation over the already-stored image information through the user interface 21. However, the facsimile transmitter 11 has the computer 14 connected thereto, such image retrieval or deletion request may be implemented by operating the computer 14.

Although the desired image has been deleted by the sender operator without receiver-side operator recognizing it in the foregoing embodiment, the present invention may be designed so that the fact that the deletion was done or image exchange was done with the already-sent image is informed to the receiver-side operator. Further, the interconnection between the facsimile transmitter and receiver 11 and 12 has been realized by means of the public network in the foregoing embodiment, but it goes without saying that the present invention is not limited to the specific example. Furthermore, though the illustrated embodiment has operated based on the ITU-T, T. 30 recommendation, the invention is not restricted to the specific example, as a matter of course.

As has been explained in the foregoing, in accordance with the embodiment of the present invention, a facsimile apparatus as a facsimile receiver has the storage unit for storing the document image information received from the facsimile transmitter and storing information (document management number) for identifying the transmission originators (original document). Therefore, when the receiving a signal demanding a retrieval of one of the received document information, the facsimile receiver can retrieve the information related to the received document information to check the presence or absence of the corresponding document information in the received-document storage unit. For this reason, even with respect to document such as confidential document which the receiver operator may possibly forget to output it, the sender side can confirm the presence or absence of the remaining document information without the need for inquiring of the receiver-side operator about it. Thus, the document sender can advantageously make sure himself or herself the fact that the receiver operator has not yet output the sent document.

In accordance with the embodiment of the present invention, when the facsimile receiver receives a deletion request demanding a deletion of one of the received documents, the facsimile receiver can retrieve the information related to the received document after checking the presence or absence of the corresponding document in the received-document storage unit. Thus, even with respect to such document as transmitted by the document sender, the sender can delete the document from the received-document storage unit. For this reason, when the sender finds an error in the already-transmitted document and the machine or transmission line becomes abnormal to undesirably cause erroneous transmission of an image, the sender can delete the document or image so long as it still remains in the received-document storage unit, thereby eliminating the need for the sender to again send its correct document and thus for the receiver to conduct the wasteful printout of the unnecessary document, preventing the transmission of the erroneous information.

Further, in accordance with the embodiment of the present invention, a facsimile apparatus as a facsimile transmitter sends the information for uniquely specifying the document to be transmitted. Moreover, the facsimile apparatus, after the document transmission, also can issue a request for retrieval of the presence or absence of the document remaining in the received-document storage unit of the facsimile receiver side with use of the information uniquely specifying the document as a retrieval key. For this reason, when the operator of the facsimile transmitter finds any fault in the document, such as a partially wrong part in the contents of the document, the sender operator can again send its right or normal document without causing any troubles to the operator of the facsimile receiver side or can tell the receiver-side operator about the corrected portion by telephone, thus improving the reliability of the transmission document.

In accordance with the embodiment of the present invention, a facsimile apparatus as a facsimile transmitter transmits a document and information for uniquely specifying the document. Also, the facsimile apparatus, after the document transmission, can issue a request for retrieval of the presence or absence of the document remaining in the received-document storage unit of the facsimile receiver side with use of the information uniquely specifying the document as a retrieval key. Further, the facsimile transmitter, when receiving the retrieval result from the facsimile receiver, displays it, on the basis of which the sender operator can confirm the fact that the corresponding document is being stored in the received-document storage unit of the addressee or facsimile receiver and after confirming it, can issue a request for deleting the document.

In this way, since the retrieval result can be once displayed on the facsimile transmitter and the sender operator can delete the corresponding document as necessary, there can be reduced a danger that the document is erroneously deleted. In addition, since the facsimile transmitter side can delete a desired part of the transmitted document without involving any troubles to the facsimile receiver side, the present invention has an advantage that the sender side can delete the corresponding document without imposing any burden on the receiver side and also without the receiver side recognizing it.

In accordance with the embodiment of the present invention, when it is desired for a facsimile transmitter side to issue a request to a facsimile receiver to delete a document once transmitted thereto, since the facsimile transmitter can know whether or not the facsimile receiver has a capability of deleting the document by means of a capability discrimination unit, wasteful works involved by the deletion can be lightened.

What is claimed is:

1. A facsimile apparatus comprising:

a receiving unit configured to receive, in a first mode, protocol signals corresponding to a facsimile communication protocol and to receive document information transmitted from a facsimile transmitter corresponding to the facsimile communication protocol;

a storage unit configured to store said document information and document management information for specifying said document information;

an output unit configured to output contents of said document information;

a capability identifying unit responsive to a first protocol signal in said protocol signals, and configured to identify whether or not said facsimile transmitter has a capability of transmitting a first demand signal and a second demand signal demanding the stored document information:

a mode control unit responsive to said first protocol signal, and configured to shift a control from the first mode for a facsimile communication corresponding to the facsimile communication protocol, to a second mode;

said receiving unit configured to receive said first demand signal and said second demand signal which contains said document management information transmitted from said facsimile transmitter under the control of said second mode;

a determining unit, responsive to said first demand signal, configured to determine whether or not said document information remains in said storage unit without being output by said output unit under the control of said second mode;

a transmitting unit configured to transmit a result of a determination of said determining unit to said facsimile transmitter under the control of said second mode;

a searching unit, responsive to said second demand signal, configured to search said document information from said storage unit corresponding to said document management information in said second demand signal under the control of said second mode; and a deleting unit configured to delete said document information which is searched by said searching unit under the control of said second mode.

2. The facsimile apparatus of claim 1, wherein said output unit outputs the contents of said document information and clears said output document information from said storage unit.

3. The facsimile apparatus of claim 1, wherein said facsimile transmitter comprises:

a second transmitting unit configured to transmit said document information and said document management information;

a generating unit configured to generate and transmit said first demand signal;

a second receiving unit configured to receive said result of the determination of said determining unit; and a display unit configured to display said result.

4. A facsimile apparatus comprising:

a transmission unit configured to transmit protocol signals corresponding to a facsimile communication protocol and transmitting document information to a facsimile receiver corresponding to the facsimile communication protocol;

a capability identifying unit responsive to a first protocol signal in said protocol signals, and configured to identify whether or not said facsimile receiver has a function of deleting stored document information which has been received from said transmission unit;

a mode control unit responsive to said first protocol signal, and configured to shift a control from a first mode for a facsimile communication corresponding to the facsimile communication protocol, to a second mode;

a confirmation request unit configured to transmit a confirmation request under the control of said second mode for requesting a confirmation of whether or not said document information remains in said facsimile receiver without being output by an output unit in said facsimile receiver by transmitting a request to said facsimile receiver;

a result reception unit configured to receive a result of said confirmation under the control of said second mode;

a display unit configured to display said result under the control of said second mode; and a deletion request unit, when it is confirmed on the basis of the display unit, for issuing a request demanding a deletion of said document stored in said facsimile receiver under the control of said second mode.

5. The facsimile apparatus of claim 4, further comprising:

a capability discrimination unit configured to check whether or not the addressee of the transmitted document has a document deletion unit that is used to delete the document stored in the storage unit in response to the request; and a document deletion request unit, when the capability discrimination unit confirms that the addressee has the document deletion unit and when it is confirmed on the basis of the display unit that the corresponding document is stored in the storage unit of the addressee, issuing a request demanding deletion of the document.

6. A method of deleting a facsimile transmission, comprising:

a) receiving, by a facsimile apparatus, document information transmitted from a facsimile transmitter corresponding to a facsimile communication protocol;

b) receiving, by said facsimile apparatus, a first demand signal and a second demand signal which contains document management information for demanding the deletion of said document information specified by said document management information, said first and second demand signals being transmitted from said facsimile transmitter;

c) storing, by said facsimile apparatus, said document information and document management information for specifying said document information;

d) outputting, by said facsimile apparatus, contents of said document information upon receipt of a command for requesting output of said document information, and deleting said document information after the outputting has been performed;

e) determining, by said facsimile apparatus in response to said first demand signal, whether or not said document information remains stored at said facsimile apparatus and has not been outputted as yet;

f) transmitting, by said facsimile apparatus to said facsimile transmitter, a result of the determination made in the step e);

g) determining, by said facsimile apparatus in response to said document management information in said second demand signal, if said corresponding document information is currently stored; and h) deleting, by said facsimile apparatus, said corresponding document information if said corresponding document information is currently stored, wherein, after transmitting the result of the determination in the step f), said facsimile apparatus receives said second demand signal that contains the document management information to be deleted, and wherein said facsimile apparatus searches and deletes the corresponding document information in response to said second demand signal.

7. A method of deleting a facsimile transmission, comprising:

a) receiving, by a facsimile apparatus, protocol signals corresponding to a facsimile communication protocol and document information transmitted from a facsimile transmitter corresponding to the facsimile communication protocol;

b) storing, by said facsimile apparatus, said document information received from said facsimile transmitter and document management information for specifying said document information;

c) outputting, by said facsimile apparatus, contents of said document information;

d) identifying, by said facsimile apparatus in response to a first protocol signal in said protocol signals, whether or not said facsimile transmitter has a capability of transmitting a first demand signal and a second demand signal demanding the stored document information;

e) shifting, by said facsimile apparatus in response to said first protocol signal, a control from a first mode for a facsimile communication corresponding to the facsimile communication protocol, to a second mode;

f) receiving said first demand signal and said second demand signal containing said document management information transmitted from said facsimile transmitter under the control of said second mode;

g) determining, under the control of said second mode, by said facsimile apparatus in response to said first demand signal, whether or not said document information remains stored at said facsimile apparatus and has not been outputted as yet;

h) transmitting, under the control of said second mode, by said facsimile apparatus to said facsimile transmitter, a result of the determination made in the step g);

i) determining, under the control of said second mode, by said facsimile apparatus in response to said document management information in said second demand signal, if said corresponding document information is correctly stored; and j) deleting, under the control of said second mode, by said facsimile apparatus, said corresponding document information if said corresponding document information is correctly stored.

* * * * *